Jan. 12, 1954 A. W. LUNDELL 2,665,724
REFRIGERATED MEAT CHOPPER
Filed Oct. 20, 1950 2 Sheets-Sheet 1
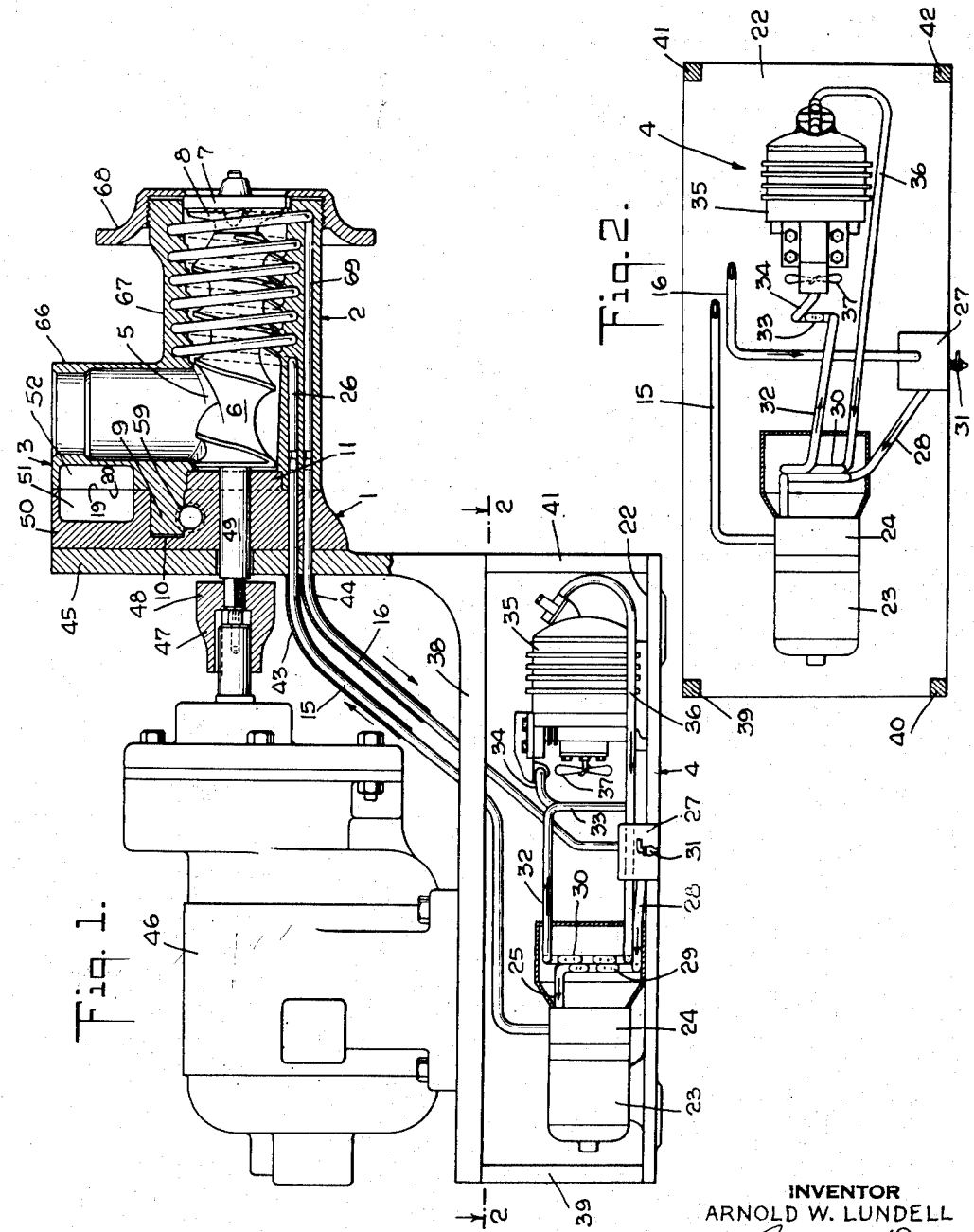
INVENTOR
ARNOLD W. LUNDELL
BY Gustav Drews
his ATTORNEY Jan. 12, 1954
A. W. LUNDELL
2,665,724
REFRIGERATED MEAT CHOPPER
Filed Oct. 20, 1950
2 Sheets-Sheet 2
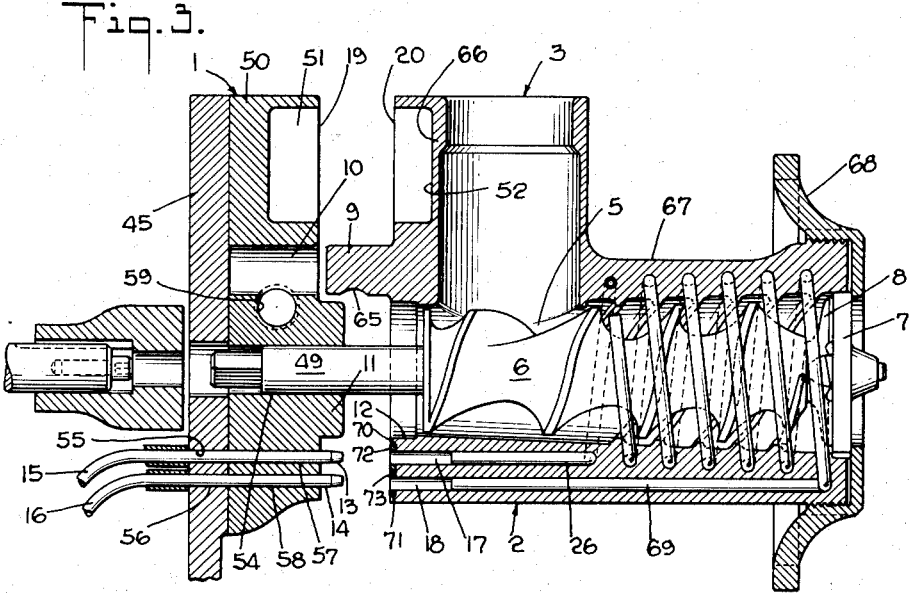
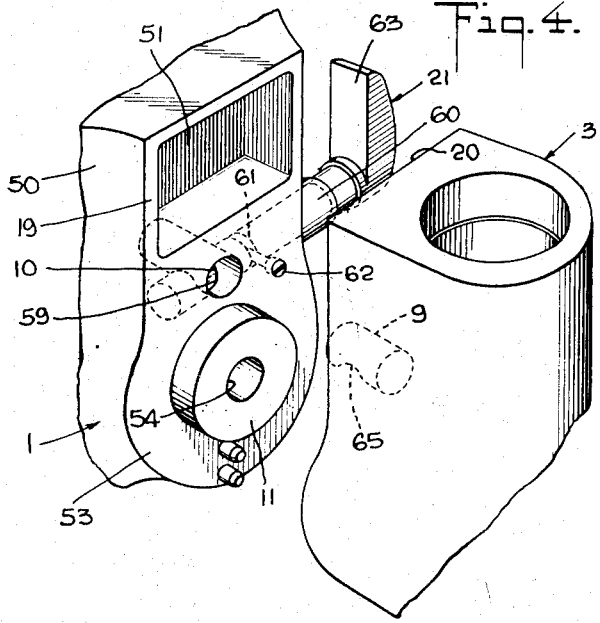
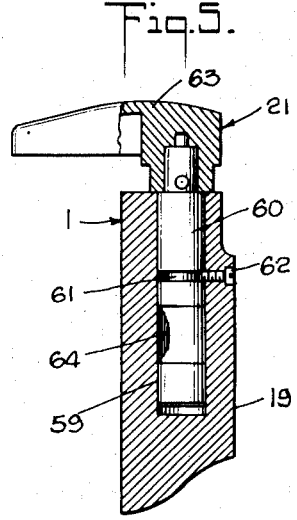
INVENTOR
ARNOLD W. LUNDELL
BY *Gustav Drews*
*his* ATTORNEY Patented Jan. 12, 1954

2,665,724

UNITED STATES PATENT OFFICE 2,665,724

REFRIGERATED MEAT CHOPPER

Arnold W. Lundell, Byram, Conn., assignor to Globe Slicing Machine Co., Inc., Stamford, Conn., a corporation of New York Application October 20, 1950, Serial No. 191,618

1 Claim. (Cl. 146—182)

This invention relates to meat choppers in general and more especially to a refrigerated meat chopper casing associated with a refrigerating unit.

Among the objects of the present invention it is aimed to provide an improved refrigerated meat chopper casing associated with a refrigerating unit in which the meat chopper casing has a stationary or fixed section having inlet and outlet conduits secured therein with portions thereof protruding therefrom, and a removable casing section including the inlet funnel and the chambered cylinder for housing the advancing screw, the removable section having a passage cast therein in the form of a spiral or the like in the cylinder wall around the screw receiving chamber with two openings to receive the protruding inlet and outlet conduit portions of the fixed casting for conveying the refrigerant or heat transferring medium from the refrigerating system to the wall of the removable casing.

It is still another object of the present invention to provide a removable meat chopper casing including the inlet funnel and the chambered cylinder for housing the advancing screw in the wall of which surrounding the chamber for the advancing screw there is embedded a preformed metal tube, in spiral or coil form, terminating in inlet and outlet openings to receive the protruding portions of inlet and outlet conduits of a refrigerating system for conveying the refrigerant or heat transferring medium to the wall of the removable casing.

It is still another object of the present invention to provide an improved two sectional meat chopper casing having a stationary section having a main plane contact face, the stationary section provided with a journal for the shaft of the advancing screw and supporting parts of the inlet and outlet conduits of the refrigerating system with the ends thereof protruding from said main plane contact face, and the removable section having a second main plane contact face including the inlet funnel and the chambered cylinder for the advancing screw with a spiral passage for the refrigerant formed in the wall of the cylinder and terminating in inlet and outlet openings in said second main contact face positioned to receive the protruding portions of the inlet and outlet conduits formed in said stationary section, and a clamping device for drawing the two main contact faces into intimate engagement with one another, thereby to seal off any leakage either from the chamber for the advancing screw or from the passage for the heat transferring medium.

These and other features, capabilities and advantages of the invention will appear from the subjoined detailed description of one specific embodiment thereof illustrated in the accompanying drawings, in which Fig. 1 is a side elevation of the refrigerating unit motor and meat chopping unit, with the meat chopping unit in section.

Fig. 2 is a plan view of the refrigerating unit on the line 2—2 of Fig. 1.

Fig. 3 is a longitudinal section of the meat chopping unit showing the two main sections separated.

Fig. 4 is a fragmental perspective showing the two main sections of the meat chopping unit separated.

Fig. 5 is a transverse section of the cam device for clamping the two sections together.

Although refrigerating systems have heretofore been connected to meat chopping casings, these did not lend themselves for practical purposes to be connected with meat chopping machines, such as disclosed in applicant's co-pending patent application Ser. No. 35,402 filed June 26, 1948, which became Patent No. 2,539,448 on Jan. 30, 1951, where the casing is composed of two sections to facilitate cleaning and the like by the shopkeeper. One of the objects of the present invention, therefore, is to provide a cooling system for a meat chopping machine of the type disclosed in applicant's co-pending application for patent aforesaid which will not only retain all of the advantages of such meat chopping machines, but in addition have the advantage of cooling the same without in any way encumbering a meat chopper made according to applicant's prior patent application, and retain not only all of the advantages of such prior meat chopping machine, but possess many additional advantages.

With applicant's invention it will be seen that the advantages, in the interest of sanitation of providing a two section meat chopping casing, including the fixed section 1 and the removable section 2, such as disclosed in applicant's aforesaid copending application for patent are retained, and the meat chopper 3 may be located on the store counter or any other convenient location without regard to the location of the refrigerating system 4, the removable section 2 may be removed from the section 1 just as heretofore to facilitate cleaning the chamber 5, the advancing screw 6, perforated disk 7, and rotary cutter 8, and the removable section in turn may be replaced in operative relation not only for cutting meat but also in air-tight relationship with the refrigerating system 4 by merely repositioning the several parts, such as the screw 6, perforated disk 7 and cutter 8, and then by means of the projection 9 fitting in the opening 10, the cylindrical enlargement 11 fitting in the cylindrical opening 12, and the protruding portions 13 and 14 of the inlet and outlet conduits 15 and 16, respectively, extending from the section 1 fitting in the openings 17 and 18 in the section 2 to cooperate with one another as indices properly to position the sections 1 and 2 in a predetermined position where the plane contact faces 19 and 20 of the sections 1 and 2, respectively, will in turn cooperate with one another effectively to seal the rear end of the chamber 5 formed in the casing section 2 and also to seal the connections between the protruding portions 13 and 14 of the conduits 15 and 16, respectively, extending from the section 1 and the openings 17 and 18 formed in the section 2 when the clamping device 21 journalled in the section 1 is turned in engagement with the projection 9.

The refrigerating system or unit 4 in the present instance is mounted on the platform 22 having a motor 23 at one end operatively connected to a pump mounted in the casing 24 to draw the heat transferring medium, air as an instance, through the conduit 25 and then forcing it up into and through the conduit 15 to the passage 26 in the casing 2. From the passage 26, the medium is then forced down through the inlet conduit 16 to the condensation trap 27 and then out through the conduit 28 into the coil portion 29 up to the conduit 25.

As the heat transferring medium passes through the coil portion 29 adjacent the refrigerating coil portion 30, the heat transferring medium will be cooled. Should the heat transferring medium contain any moisture, it is permitted to condense and return from the coil 29 down through the conduit 28 into the condensation trap 27, there to be drawn off by the petcock 31 from time to time. Similarly, if any moisture should have been picked up by the heat transferring medium, air as an instance, while passing through the passage 26, it is permitted to return through the conduit 16 to the condensation trap 27.

The refrigerating coil portion 30 is connected by the conduit 32 to the condenser coil portion 33 and from the condenser coil portion 33 by means of the conduit 34 to the compressor 35, and from the compressor 35 by means of the conduit 36 back to the refrigerating coil portion 30. The compressor 35 is provided with the conventional fan 37 to direct air at the condenser coil portion 33 to aid in condensing the refrigerating medium being circulated therethrough. The refrigerating medium may be of any of the conventional mediums today extensively used, such for instance as Freon. In the present instance, of course, the refrigerating medium is contained in a closed system and similarly the heat transferring medium is contained in a closed system.

With the present invention, air is preferably used as the heat transferring medium so that when the casing section 2 is separated from the casing section 1, there will be no loss in the heat transferring medium, since obviously whatever air, previously retained within the system which escapes, will be resupplied from the atmosphere.

The platform 22 on which the refrigerating unit 4 is mounted in the present instance is connected to the platform 38 by the rods or bars 39, 40, 41 and 42. Obviously, however, without departing from the spirit of the invention, this refrigerating unit may be located in another room as an instance, in which case the conduits 15 and 16 of course would be materially increased in length. However, since the conduit portions 15 and 16 between the refrigerating unit 4 and the casing section 1 preferably are enclosed in insulating shields 43 and 44 throughout, only parts of the shields 43 and 44 being shown adjacent the bracket 45 to which the casing section 1 is fixed, the effect on the heat transferring medium, air as an instance, will be immaterial if the lengths of the conduits 15 and 16 are increased to accommodate such remote positioning of the refrigerating unit 4 relative to the meat chopping unit 3.

Associated with the meat chopping unit 3 as disclosed in my copending application aforesaid, there is provided a motor 46 mounted in the present instance on the platform 38 which is provided with a coupling 47 to receive the angular portion 48 of the shaft 49 fixed in the present instance to the advancing screw 6. The coupling 47 as shown in Figs. 1 and 3 is preferably spaced from the inner face of the bracket 45, to the outer face of which the section 1 of the casing 3 is fixed.

The section 2 preferably is provided with an upward extension 50 which is preferably chambered at 51 as shown and provided with an inner machine finished plane contact face 19 from the lower portion 53 of which there extends the cylindrical enlargement 11 provided with a central opening 54 in which the shaft 49 is journalled. The bracket 45 and section 1 below the opening 54 in the present instance is provided with alined openings, as an instance, the openings 55 and 56 in the bracket 45 registering with the openings 57 and 58, respectively, in section 1 to receive the conduits 15 and 16 and permit the protruding portions 13 and 14 of the conduits 15 and 16, respectively, to protrude from the face 52 below the cylindrical enlargement 11. Preferably the protruding portions 13 and 14 as shown are tapered or beveled, as shown in Figs. 3 and 4.

The opening 10 in the section 1 in the present instance extends parallel with the opening 54 and openings 57 and 58 and is cylindrical in conformation. This opening 10 as shown communicates with the cylindrical opening 59 extending transverse to the direction of the opening 10 and intersecting one another approximately a 25% quadrant of the cylindrical opening 59 and in turn also approximately a 25% quadrant of the opening 10. Furthermore, the opening 59 preferably extends into the section 1 through one side of the section 1 as shown to receive the cylindrical bar 60 of the clamping device 21. The cylindrical bar 60 in the present instance is provided with an annular recess 61 to receive the set screw 62 and rotatably anchor the bar 60 in the section 1. The outer end of the bar 60 is preferably provided with a handle 63. The clamping function of the clamping device 21 is preformed by the portions of the bar 60 adjacent the approximately 90° cylindrical recess 64 formed in the bar 60 at right angles to the axis thereof. The radius of the recess 64 in turn conforms to the radius of the opening 10 and the cylindrical projection 9 so that when the recess 64 registers with the opening 10 to clear the cylindrical passage through the opening 10, the projection 9 may be inserted into the same. The projection 9 in turn has a substantially 90° cylindrical recess 65 formed therein at right angles to the axis of the projection 9, the radius of which in turn conforms to the radius of the opening 59 so that when the projection 9 is positioned in the opening 10 and the bar 60 is rotated angularly it will move the uninterrupted portion of the bar 60 into the recess 65 and draw the contact faces 19 and 20 into intimate engagement with one another. In order to effect such forced engagement, preferably the distance from the outer edge of the opening 59 to the contact face 19 will be greater than the distance between the inner edge of the recess 65 to the contact face 20.

The casing section 2 preferably as shown has the chambered funnel extension 66 which is chambered at 52 on the outside as shown. The chamber of the funnel extension 66 commuicates with the chamber 5 to enable the meat to be cut to be fed to the advancing screw 6. The advancing screw 6 in the conventional way has fixed thereto the cutter 8 anchored in rotatable engagement with the inner face of the disk 7 which is in turn locked to the outer end of the cylindrical portion 67 of the casing section 2 by the locking ring 68.

The wall of the cylindrical portion 67 between the funnel extension 66 and the outer end thereof, as shown, has a spiral passage 26 formed therein in communication with the longitudinally extending openings 17 and 18. Excellent results have been achieved when the spiral passage 26 and the openings 17 and 18 are formed by placing a metal tube composed as an instance of copper, nickel or the like, in the casting mold before introducing the molten mass, such as iron, aluminum, or an alloy of nickel and iron known in the trade as "niresist". Preferably the tube 69 so placed in the mold before the molten mass is introduced terminates a short distance from the location of the contact face 20 as shown, and removable plugs or collapsible mold portions are positioned at the ends of the tube 69 to form the openings 17 and 18. In turn at the outer ends of the openings 17 and 18 annular recesses 70 and 71, respectively, are formed either by casting or subsequently by machining to receive washers or grommets 72 and 73, respectively, composed either of rubber or soft metal to form an airtight connection with the protruding portions 13 and 14 when they are inserted into the openings 17 and 18 and the clamping device 21 is turned to cause the contact faces 19 and 20 intimately to engage one another. Preferably the grommets 72 and 73 may protrude slightly from the face 20 in position to engage the face 19 to receive the full force of the pressure when the two faces 19 and 20 are pressed into intimate engagement with one another by the clamping device 21. Care must obviously be exercised that the grommets 72 and 73 will not be spread over the face 20 to form fins when brought into engagement with the contact face 19, and that the grommets 72 and 73 will be fully and effectively compressed into the recesses 70 and 71, respectively, so that the faces 19 and 20 engage one another throughout. As aforesaid, these contact faces 19 and 20 are accurately planed so that they will intimately engage one another throughout their surfaces when the clamping device 21 is turned to clamp them into intimate engagement with one another.

Obviously, without departing from the spirit of the invention, a conventional manually controlled thermostat or thermostatic switch could be connected either to section 1 or section 2 of the meat chopper casing and electrically connected to the motor 23 and compressor 35 so that a predetermined temperature could be maintained in the casing 2 by manually setting the thermostat or thermostatic switch for the temperature desired and depending upon the thermostat or thermostatic switch automatically to control the operation of the motor 23 and compressor 35.

It is obvious that various changes and modifications may be made to the details of construction without departing from the general spirit of the invention as set forth in the appended claim.

I claim:

A commodity chopper operatively connected to a refrigerating system having feed and return conduits and a pump for circulating a heat transferring medium by means of said conduits to and from the commodity chopper, the commodity chopper being characterized by a cutter and advancing screw having a shaft, a stationary casing section, a removable casing section chambered to form a funnel and main passage for said cutter and advancing screw, there being a channel formed in the wall of said removable section surrounding said main passage, said casing sections having opposing accurately planed contact faces, feed and return ends for the channel in said removable section terminating in the contact face of said removable section, annular recesses surrounding said ends, compressible washers disposed in said annular recesses, the feed and return conduits of the refrigerating system having portions extending through said stationary section and protruding from the contact face of said stationary section in position to register with the feed and return ends, respectively, of the channel in said removable section, the protruding portions of the feed and return conduits being tapered, but otherwise snugly conforming to the inner contour of the said feed and return ends to afford a snug fit with one another, a projection on said stationary section extending from its contact face and snugly conforming to the interior of the rear end of the main passage in said removable section, and clamping means for clamping said casing sections with their contact faces in intimate engagement with one another to seal off against leakage not only the rear end of the main passage in said removable casing, but also the connections between the protruding portions of the feed and return conduits and the feed and return ends of the channel, said projection cooperating with the protruding portions of said feed and return conduits being parallel to one another and cooperating with one another to serve as indexes for accurately positioning the removable casing section relative to said stationary casing section when said clamping means are operated to draw the contact faces into intimate engagement with one another.

ARNOLD W. LUNDELL.

References Cited in the file of this patent

UNITED STATES PATENTS

| Number | Name | Date |
|---|---|---|
| 1,182,711 | Royle | May 9, 1916 |
| 1,516,841 | Buttfield | Nov. 25, 1924 |
| 1,914,689 | Humprey | June 20, 1933 |
| 1,942,082 | Biancalava | Jan. 2, 1934 |
| 1,942,083 | Biancalava | Jan. 2, 1934 |
| 1,960,708 | Loomis | May 29, 1934 |
| 2,151,476 | Kimble | Mar. 21, 1939 |
| 2,273,631 | Edwards | Feb. 17, 1942 |
| 2,302,574 | Richardson | Nov. 17, 1942 |
| 2,333,669 | Ness | Nov. 9, 1943 |
| 2,475,468 | Andrews | July 5, 1949 |
| 2,526,498 | Pacciano | Oct. 17, 1950 |
| 2,539,448 | Lundell | Jan. 30, 1951 |
| 2,541,201 | Buecken et al. | Feb. 13, 1951 |